United States Patent [19]

Toyofuku

[11] Patent Number: 5,212,520
[45] Date of Patent: May 18, 1993

[54] BEARING STRUCTURE FOR SUPPORTING A PHOTOCONDUCTIVE ELEMENT OF AN IMAGE FORMING APPARATUS

[75] Inventor: Masafumi Toyofuku, Kawasaki, Japan

[73] Assignee: Ricoh Company, Ltd., Tokyo, Japan

[21] Appl. No.: 799,937

[22] Filed: Nov. 29, 1991

[30] Foreign Application Priority Data

Nov. 30, 1990 [JP] Japan ................................ 2-339669
Nov. 30, 1990 [JP] Japan ................................ 2-339670
May 7, 1991 [JP] Japan ................................ 3-101474

[51] Int. Cl.⁵ ............................................. G03G 15/00
[52] U.S. Cl. .................................... 355/200; 384/219; 355/210; 355/326
[58] Field of Search ............... 355/200, 210, 326; 248/602, 638, 913; 384/215, 218, 219, 258, 259, 267, 269

[56] References Cited

U.S. PATENT DOCUMENTS

| | | | |
|---|---|---|---|
| 2,093,681 | 9/1937 | Valley | 384/269 |
| 2,403,171 | 7/1946 | Cook | 384/269 |
| 3,586,399 | 6/1971 | Muller | 384/219 |
| 3,592,518 | 7/1971 | Pfister et al. | 384/219 |
| 4,120,576 | 10/1978 | Babish | 355/200 |
| 4,167,321 | 9/1979 | Miyashita et al. | 355/200 |
| 4,386,839 | 6/1983 | Kumagai et al. | 355/200 |
| 4,425,036 | 1/1984 | Kameyama et al. | 355/200 |
| 4,449,809 | 5/1984 | Tamura | 35/200 |
| 4,922,297 | 5/1990 | Kondo | 355/200 X |
| 4,951,599 | 8/1990 | Damji | 355/200 X |
| 5,023,660 | 6/1991 | Ebata et al. | 355/200 |
| 5,081,488 | 1/1992 | Suzuki | 355/200 |

Primary Examiner—R. L. Moses
Attorney, Agent, or Firm—Oblon, Spivak, McClelland, Maier & Neustadt

[57] ABSTRACT

A structure for supporting a photoconductive element included in an image forming apparatus. The shaft of the photoconductive element is supported by two adjoining bearings. One of the bearings is pressed against a framework or a slider by a leaf spring to be thereby fixed in place. The other bearing is movable relative to the framework or the slider and pressed against the shaft by another spring in the same direction as the first-mentioned bearing. The structure prevents the shaft and, therefore, the photoconductive element from tilting or shaking to thereby prevent an exposing position on the element from being changed.

11 Claims, 4 Drawing Sheets

BEARING STRUCTURE FOR SUPPORTING A PHOTOCONDUCTIVE ELEMENT OF AN IMAGE FORMING APPARATUS

BACKGROUND OF THE INVENTION

The present invention relates to a copier, facsimile apparatus, printer or similar image forming apparatus of the type transferring a toner image from a photoconductive element to a recording medium.

With an image forming apparatus of the type described, there is an increasing demand for the high reproducibility of halftone and thin lines and for easy editing and processing of image data. To meet this demand, an image forming apparatus of the kind using, for example, a laser beam modulated by a digital signal as writing light has been proposed and put on the market in various forms. This kind of image forming apparatus can write an image over only an extremely narrow width on a photoconductive element, e.g., the width is as narrow as about 70 microns when the image density is 400 dots per inch. Hence, a change in the writing position on the photoconductive element directly translates into a change in the distance between nearby dots, resulting in noticeable irregularities in density on a reproduction. The irregular rotation of the photoconductive element and the vibration of the entire apparatus are the typical factors that cause the writing position to change, and various countermeasures have been proposed in the past. Taking the vibration of the photoconductive element as an example, a bearing which supports the shaft of the element is loose fit to facilitate the replacement or the like of the element and, therefore, a clearance exists between the shaft and the bearing. It follows that a plurality of photoconductive elements as often included in a particular type of image forming apparatus fail to be parallel to one another, i.e., their axes are inclined.

To eliminate the influence of the above-mentioned clearance, the shaft of the photoconductive element or the bearing may be urged in one direction to compensate for the clearance, as disclosed in Japanese Utility Model Publication No. 185151/1988 and Japanese Patent Laid-Open Publication No. 94356/1989. However, the problem with this scheme is that an adjusting screw for urging the bearing in one direction is accommodated in a narrow space defined at the side and, therefore, not easy to operate. Moreover, even if the machining accuracy of the shaft and bearing is high, a single bearing cannot eliminate a small clearance and, therefore, causes the shaft to shake and tilt.

The bearing may be implemented by a ball bearing having an inner race, balls, and an outer race. Such a bearing is not desirable since the outer race, balls and inner race have clearances therebetween. Further, the shaft of the photoconductive element would be loose fit in the inner race. For example, assume that the outside diameter of the shaft is 12 millimeters, and that the tolerance thereof is f7. Then, since the inside diameter of a bearing generally has a tolerance of 0 to 0.05 millimeters, the clearance between the shaft and the inner race of the ball bearing is as great as 11 to 34 microns.

Among the clearances stated above, the clearance within the bearing may be eliminated by prepressurization, as has been customary in the machine tool and precision machine industries. When use is made of a slide bearing, the clearance within the bearing will be eliminated. However, when it comes to the clearance between the bearing and the shaft, simply reducing the clearance would make the assembly extremely difficult and, moreover, make the accuracy requirement of the shaft diameter extremely severe to thereby increase the cost. Assume that the clearance between the shaft and the bearing is 11 to 34 microns, and that the shaft of the photoconductive element is adjusted in position to compensate for the clearance. Then, since the distance between dots is 62.5 microns in an image forming apparatus having an image density of 400 dots per inch, a displacement of the shaft of 11 to 34 microns corresponds to 17 to 54 percent of the dot distance and, therefore, unavoidably appears on a reproduction as irregular densities.

SUMMARY OF THE INVENTION

It is, therefore, an object of the present invention to provide a structure for supporting a photoconductive element of an image forming apparatus which eliminates the change in dot distance ascribable to the change in the image writing position on the element, thereby insuring attractive images free from irregular densities.

It is another object of the present invention to provide a structure for supporting a photoconductive element of an image forming apparatus which allows the shaft of the element to be readily adjusted in position.

In accordance with the present invention, a structure for supporting a photoconductive element included in an image forming apparatus comprises a shaft mounting the photoconductive element thereon and journalled to a framework of the apparatus, a first bearing supporting the shaft and fixed in place by being pressed against the framework, and a second bearing supporting the shaft and adjoining the first bearing. The second bearing is movable relative to the framework and pressed against the shaft in the same direction as the first bearing.

Also, in accordance with the present invention, a structure for supporting a photoconductive element included in an image forming apparatus comprises a shaft mounting the photoconductive element thereon and journalled to a framework of the apparatus, a slider movable relative to the framework and adjustable in position, a first bearing supporting the shaft and fixed in position by being pressed against an inner surface of the slider, and a second bearing supporting the shaft and adjoining the first bearing. The second bearing is movably received in the slider and pressed against the shaft in the same direction as the first bearing.

Further, in accordance with the present invention, a structure for supporting a photoconductive element included in an image forming apparatus comprises a shaft mounting the photoconductive element thereon and journalled to a framework included in the apparatus, a slider movable while holding a single bearing which rotatably supports the shaft, a case supporting the slider in a movable manner, an adjusting screw threaded into a wall of the case located at an operating side, and an adjusting block received in the case to be movable in a direction intersecting a direction in which the slider is movable, and slidably contacting the slider. The surfaces of the adjusting block and slider which contact each other are inclined relative to both of the direction of movement of the slider and a direction in which the adjusting block is movable.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
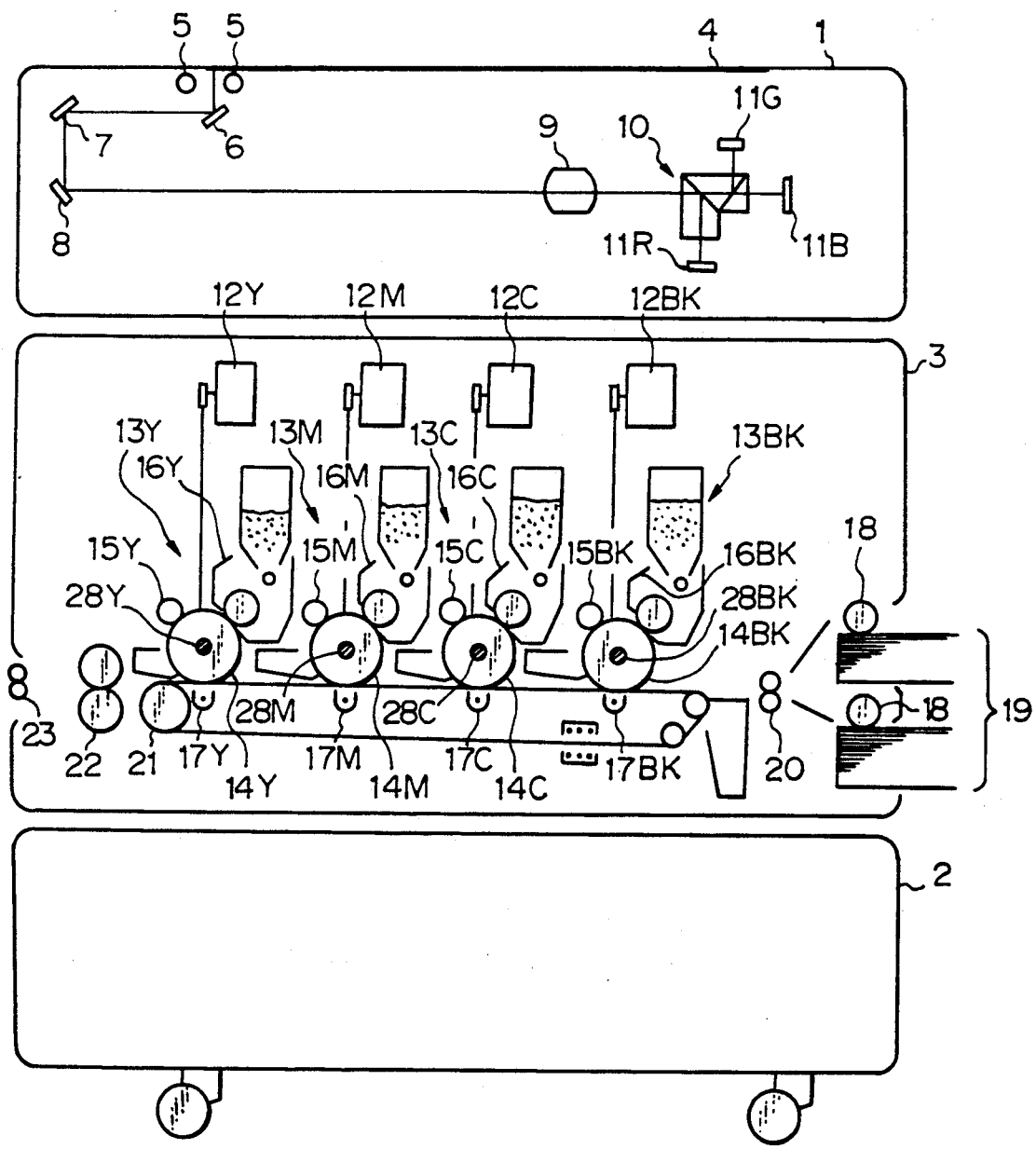
FIG. 1 is a section of a copier which is a specific form of an image forming apparatus implemented with the present invention.

Referring to FIG. 1 of the drawings, an image forming apparatus to which illustrative embodiments of the present invention are applied is shown and implemented as a color copier by way of example. As shown, the copier is generally made up of a scanner section 1, an image processing section 2, and a printer section 3. The scanner section 1 reads a document laid on a glass platen 4 and delivers the resulting digital image signal to the image processing section 2. The printer 3 prints out an image on a recording medium or sheet in response to color-by-color recording data fed thereto from the image processing section 2.

Specifically, the scanner section 1 has a fluorescent lamp or similar lamp 5 for illuminating the document laid on the glass platen 4. A reflection or imagewise light from the document is routed through mirrors 6, 7 and 8 to be incident to a focusing lens 9. The lens 9 focuses the imagewise light onto a dichroic prism 10 to be separated into light components each having a particular wavelength, e.g., a red component R, a green component G, and a blue component B. These light components are each incident to one of light-sensitive elements, e.g., CCD (Charge Coupled Device) arrays 11R, 11G and 11B. The CCD arrays 11R, 11G and 11B individually convert the incident light components to digital signals and delivers them to the image processing section 2. In response, the image processing section 2 processes the digital signals to produce recording signals of particular colors, e.g., black (Bk), yellow (Y), magenta (M), and cyan (C). If desired, one of the four recording devices shown in FIG. 1 and assigned to Bk, C, M and Y, respectively, may be omitted to form a color image in three colors.

The signals from the image processing section 2 are each applied to the printer section 3, i.e., to one of lasers 12Bk, 12C, 12M and 12Y. The printer section 3 has four recording devices 13Bk, 13C, 13M and 13Y arranged side by side. Since the recording devices 12Bk, 13C, 13M and 13Y are identical in construction, let the following description concentrate on the recording device 13C by way of example. The same parts or structural elements of the recording devices are designated by the same reference numerals with suffixes for distinction.

The recording device 13C has a photoconductive element 14C in addition to the laser 12C. In this example, the photoconductive element 14C is implemented as a drum. A main charger 15C, an exposing position where the drum 14C is to be exposed to a laser beam from the laser 12C, a developing unit 16C, and a transfer charger 17C are arranged around the drum 14C as well as other conventional process units. After the surface of the drum 14C has been uniformly charged by the main charger 15C, it is exposed to a laser beam from the laser 12C to form a latent image representative of a cyan component. The developing device 16C develops the latent image to produce a toner image. A recording sheet is fed from a sheet feed member 19, e.g. one of two sheet cassettes by a pick-up roller 18. A register roller pair 20 drives the recording sheet at a particular timing toward a transfer belt 21. The transfer belt 21 sequentially transports the sheet to the drums 14Bk, 14C, 14M and 14Y each carrying a toner image thereon. The transfer chargers 17Bk, 17C, 17M and 17Y transfer the toner images from the associated drums 14Bk, 14C, 14M and 14Y to the sheet. Thereafter, the sheet carrying a composite color image thereon is transported to a fixing roller pair 22 to have the image fixed thereon and then driven out of the copier by a discharge roller pair 23. The transfer belt 21 electrostatically retains the sheet thereon and, therefore, transports it at the speed thereof with accuracy.

Figure 2:
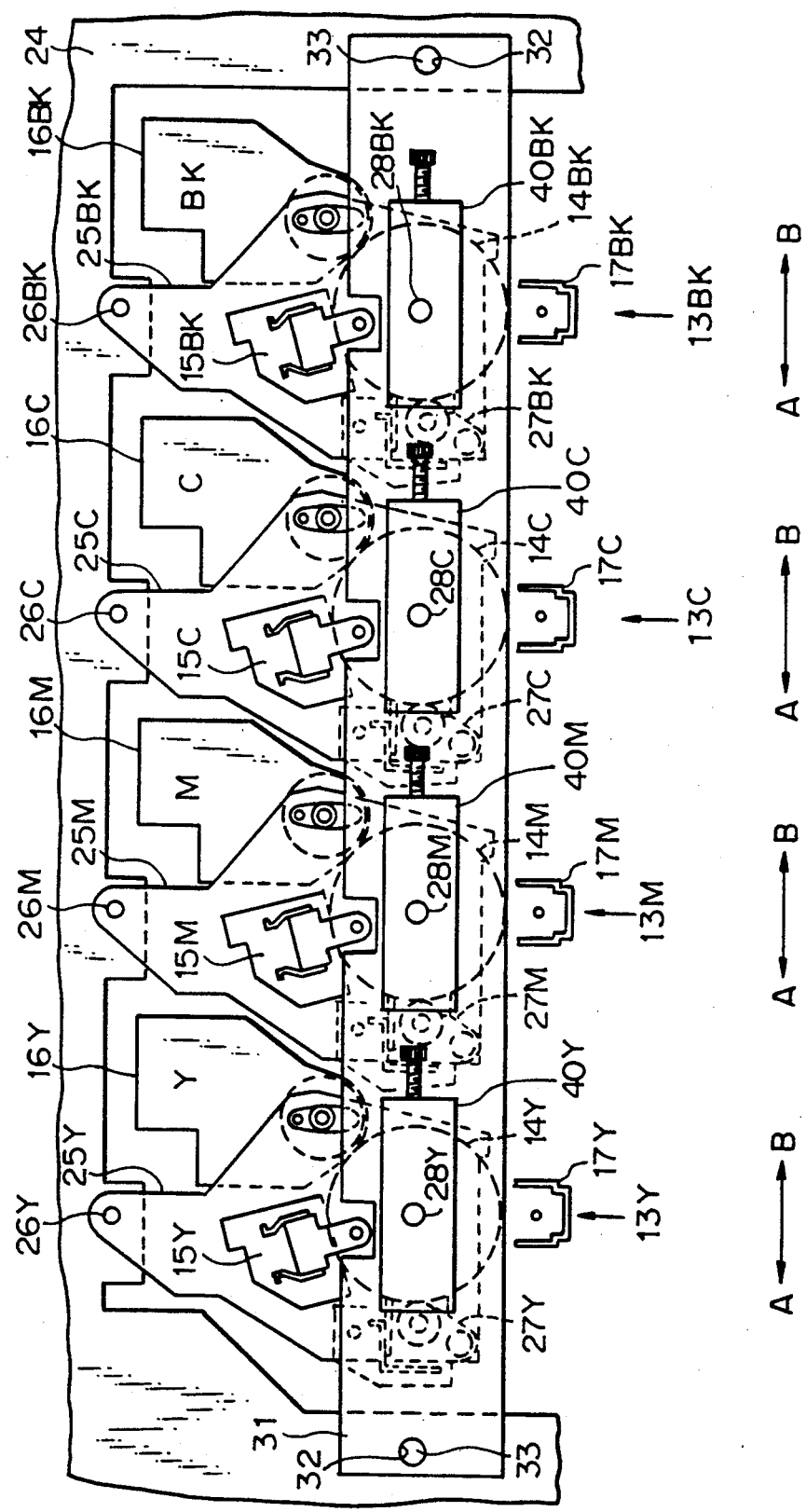
FIG. 2 is a fragmentary enlarged section of the copier shown in FIG. 1.

Referring to FIG. 2, a specific arrangement for supporting the recording devices 13Bk–13Y will be described. In FIG. 2, the same parts or structural elements ad those shown in FIG. 1 are designated by the same reference numerals. Since the recording devices 13Bk–13Y are supported in an identical configuration, the following description will also concentrate on the recording device 13C. As shown, the recording device 13C made up of the drum 14C, main charger 15C, developing unit 16C, transfer charger 17C, and cleaning unit 27C is supported by a unit plate 25C which serves as first support means. The unit plate 25C is mounted on a reference pin 26C which is studded on the framework 24 of the copier, forming part of the framework 24. The unit plate 25C is rotatable about the reference pin 26C, so that the recording device 13C is bodily movable toward and away from nearby recording devices 13Bk and 13M (arrows A and B). The drum 14C which is representative of the recording device 13C is mounted on the unit plate 25C in the manner shown in FIG. 3. As shown, a shaft 28C mounting the drum 14C thereon is passed though a bearing 29 which is affixed to the unit plate 25C, and then the shaft 28C is affixed by a nut 30.

Figure 3:
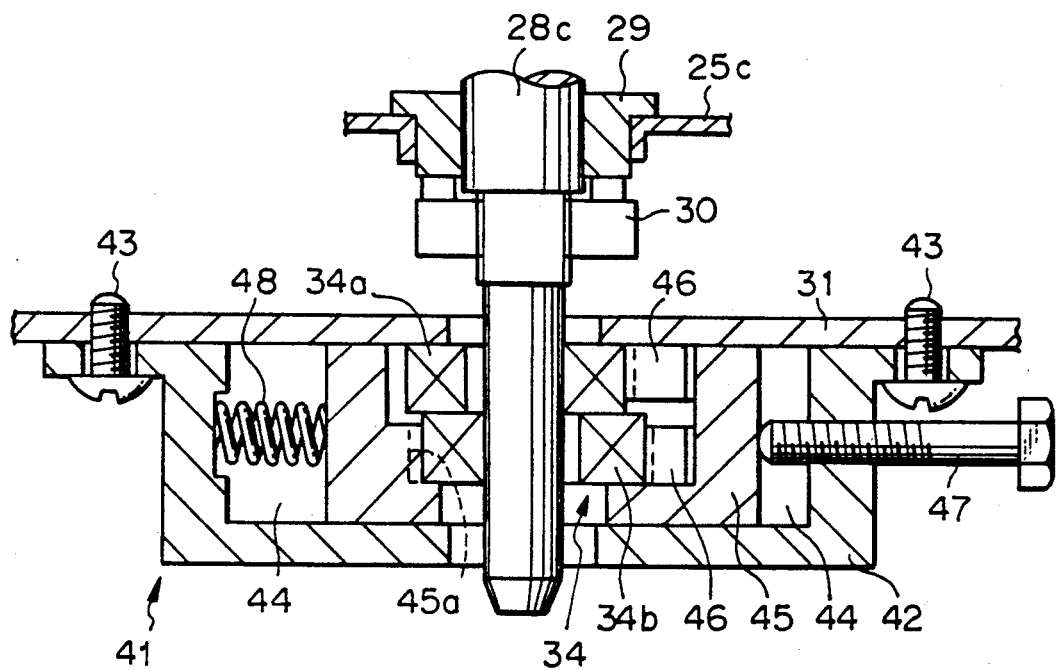
FIG. 3 is a section showing a structure for supporting a photoconductive element embodying the present invention.

After the recording device 13C has been mounted on the framework 24 by the unit plate 25C (as well as the other recording devices 13Bk, 13M and 13Y), the recording devices 13Bk–13Y are positioned relative to the framework 24 by an apparatus plate 31 (forming part of the framework 24). The apparatus plate 31 plays the role of second support means. Holes 32, FIG. 2, are formed at opposite ends of the apparatus plate 31. Pins 33 are studded on the framework 24, and each mates with the respective hole 32 to affix the apparatus plate 31 to the framework 24. A bearing 34, FIG. 3, is mounted on the apparatus plate 31 to support the shaft 28C of the drum 14C. In this manner, the recording devices 13Bk–13Y are individually positioned relative to the framework 24 and relative to one another.

Figure 4:
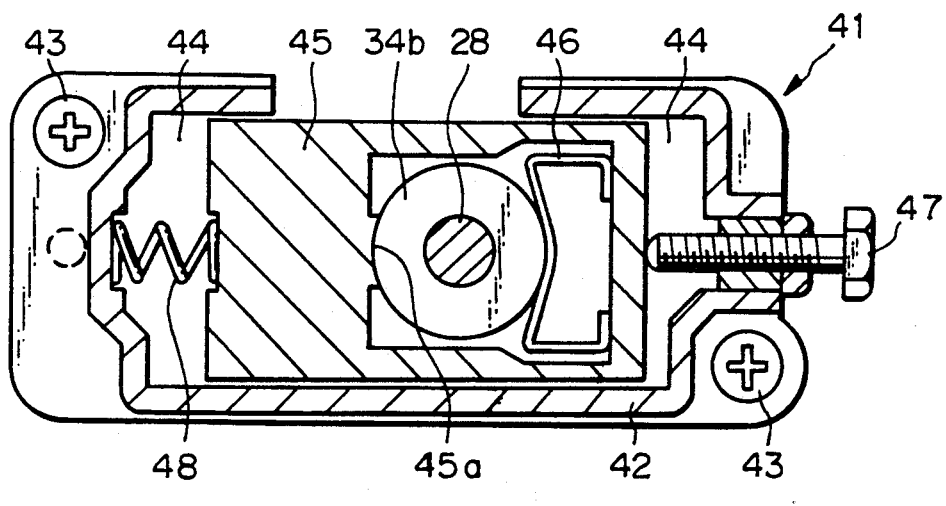
FIG. 4 is a sectional front view of the structure shown in FIG. 3.

As shown in FIGS. 3 and 4, positioning devices 41 are mounted on the apparatus plate 31, and each is associated with one of the recording devices 13Bk–13Y. Specifically, a case 42 is affixed to the apparatus plate 31 by suitable fastening means such as screws 43 and has a space 44 therein. A slider 45 is received in the space 44 and is movable bach and forth in one direction. Two bearings, e.g., bearings 34a and 34b are accommodated in the slider 45. The shaft 28 (e.g. 28C) of the drum is passed through the bearings 34a and 34b and rotatable relative to the apparatus plate 31 or the slider 45. One of the two bearings, e.g., the bearing 34b is constantly urged against the inner wall 45a of the slider 45 by a leaf spring 46 which is bent in, for example, a box-like configuration, as illustrated. This bearing 34b is, therefore, fixed in place relative to the slider 45 in the direction in which the slider 45 is movable. The other bearing, e.g., the bearing 34a is movable in any direction. The shaft 28 is loosely fitted in the bearing 34b which is fixed in place relative to the slider 45, so that a clearance exists between the bearing 34b and the shaft 28. However, the shaft 28 is pressed against the inner race of the bearing 34b by the other bearing 34a which is constantly biased by a spring 46 in the same direction as the bearing 34b. As a result, the shaft 28 is pressed against the inner races of the bearings 34a and 34b at opposite sides thereof and, therefore, rotatable with substantially no clearance existing between it and the bearing 34b. The spring 46 has a strength great enough the resist the moving force of the shaft 28.

The two bearings 34a and 34b may be directly supported by the apparatus plate (framework) 31. However, positioning the bearings 34a and 34b in the slider 45 is more advantageous since the position of the bearing 34b is adjustable to in turn adjust the position where the shaft 28 is supported. Since the position of the shaft 28 can be adjusted in the up-and-down direction by the framework due to the inherent structure of the image forming apparatus, the slider 45 has only to adjust the position in the horizontal direction. An adjusting screw 47 is threaded into the case 42 for adjusting the position of the slider 45. The slider 45 is pressed against the spring 48 disposed in the case 42 and, therefore, can be accurately held in the position defined by the adjusting screw 47. Alternatively, the tip portion of the screw 47 may be connected to the slider 45 in such a manner as to be rotatable but not axially movable relative to the slider 45, so that the slider 45 may be forced to follow the movement of the screw 47. Then, the spring 48 is omissible.

Figure 5:
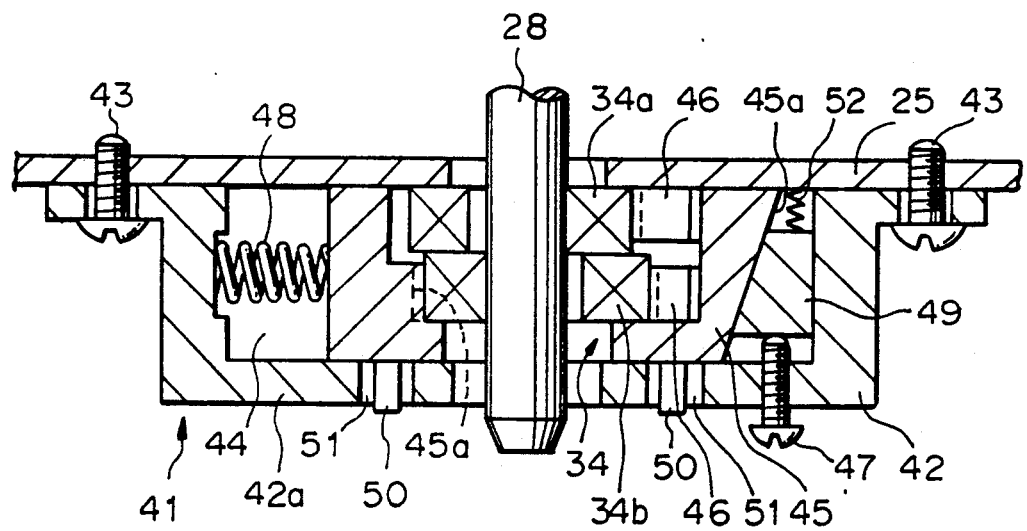
FIG. 5 is a section showing an alternative embodiment of the present invention.

Referring to FIG. 5, an alternative embodiment of the present invention is shown. As shown, the adjusting screw 47 is threaded into the wall of the case 42 located at the operating side. A wedge-like adjusting block 49 is interposed between the side wall of the case 42 and the side wall of the slider 45. The tip of the screw 47 abuts against the adjusting block 49. Pins 50 are studded on the slider 45 and received in grooves 51 formed in the front wall 42a of the case 42. The pins 50 are each linearly guided by associated one of the grooves 51. The bores 51 indicate a limited movable range of the pins 50. The surface of the slider 45 which contacts the adjusting block 49 is inclined relative to the moving direction of the slider 45, while the surface of the block 49 which contacts the side wall of the case 42 is substantially perpendicular to the moving direction of the slider 45. In this configuration, the block 49 is movable substantially perpendicular to the moving direction of the slider 45 as the screw 47 is driven into or out of the case 42. The surface of the block 49 which contacts the surface 45a of the slider 45 is inclined in a complementary configuration. More specifically, the surfaces of the block 49 and slier 45 contacting each other are inclined relative to both of the moving direction of the slider 45 and that of the block 49. As the block 49 is moved, the slider 45 is moved by the block 49 in a direction substantially perpendicular to the moving direction of the block 49. Since the slider 45 is constantly biased by the spring 48, the block 49 constantly abuts against the tip of the screw 47, depending on the inclination of the surface 45a of the slider 45. If necessary, a spring 52 may be provided for urging the block 49 toward the tip of the screw 47. Again, the tip portion of the screw 47 may be connected to the block 49 in such a manner as to be rotatable but not axially movable relative to the block 49, so that the block 49 may be forced to follow the movement of the screw 47.

Figure 6:
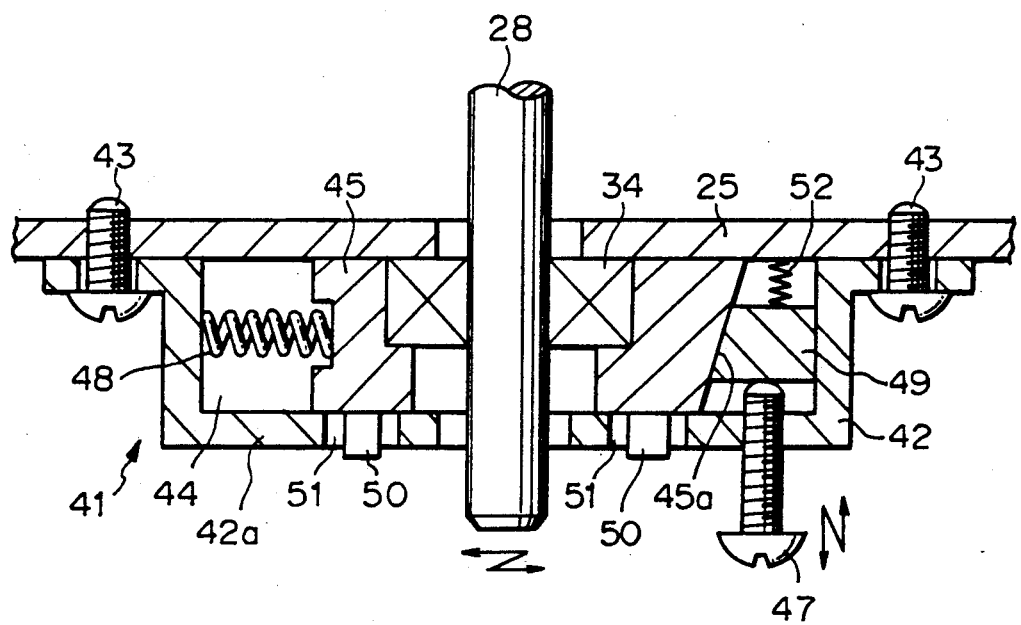
FIG. 6 is a section showing another alternative embodiment of the present invention.

FIG. 6 shows another alternative embodiment of the present invention. In FIG. 6, the same parts or structural elements as those shown in FIG. 5 are designated by the same reference numerals, and redundant description will be avoided for simplicity. While the embodiment of FIG. 5 has two bearings 34a and 34b, this embodiment has only one bearing. Specifically, a single bearing such as a ball bearing 34 is supported by the slider 45 and in turn supports the shaft 28 of the drum in a rotatable manner. One end of the bearing 34 with respect to the moving direction of the slider 45 contacts the adjusting block 49. The spring 52 may be used to press the slider 49 against the block 49, if necessary. The adjusting screw 47 is threaded into the front wall 42a of the case 42 located at the operating side. The tip of the screw 47 abuts against the block 49. The spring 52 is preloaded between the block 49 and the case 42 or the framework 25 to urge the block 49 against the screw 47. Hence, the movement of the screw 47 is surely transferred to the block 49. The moving direction of the slider 45 and that of the block 49 intersect each other, e.g., at right angle. The surfaces of the slider 45 and block 49 which contact each other are configured as inclined surfaces which are inclined relative to both of the moving direction of the slider 45 and that of the block 48. As the screw 47 is driven into or out of the case 42, it correspondingly adjusts the position of the block 49. The block 49 in turn causes the slider 45 to move due to the configuration of the inclined surface 45a.

In summary, it will be seen that the present invention provides a support structure which supports the rotatable shaft of a photoconductive element in a predetermined position accurately without any clearance only by two bearings and springs. The structure prevents the shaft and, therefore, the photoconductive element from tilting or shaking. This is successful in eliminating changes in an exposing position and insuring attractive images free from irregular densities. An adjusting screw can be manipulated on the operating side in the event of the adjustment of a slider, i.e., the shaft of the photoconductive element, facilitating the adjustment without any spatial restriction.

Various modifications will become possible for those skilled in the art after receiving the teachings of the present disclosure without departing from the scope thereof.

What is claimed is:

1. A structure for supporting a photoconductive element included in an image forming apparatus, comprising:

a shaft mounting said photoconductive element thereon and journalled to a framework of said apparatus;

a first bearing supporting said shaft and fixed in place by being pressed against said framework;

a second bearing supporting said shaft and adjoining said first bearing, said second bearing being movable relative to said framework and pressed against said shaft in a same direction as said first bearing; and pressing means for pressing against said first and second bearings such that said pressing means presses upon said first bearing to press the first bearing against said framework, and said pressing means presses upon said second bearing to press the second bearing against said shaft.

2. A structure as claimed in claim 1, wherein said pressing means comprises:

first spring means for pressing said first bearing against said framework; and second spring means for pressing said second bearing against said shaft.

3. A structure as claimed in claim 2, wherein said apparatus comprises a plurality of photoconductive elements, said first bearing, said second bearing, said first spring means and said second spring means being associated with the shaft of each of said photoconductive elements.

4. A structure for supporting a photoconductive element included in an image forming apparatus, comprising:

a shaft mounting said photoconductive element thereon and journalled to a framework of said apparatus;

a slider movable relative to said framework and adjustable in position;

a first bearing supporting said shaft and fixed in position by being pressed against an inner surface of said slider; and a second bearing supporting said shaft and adjoining said first bearing, said second bearing being movably received in said slider and pressed against said shaft in the same direction as said first bearing.

5. A structure as claimed in claim 4, further comprising spring means received in said slider for pressing said first bearing against said inner wall of said slider.

6. A structure as claimed in claim 5, wherein said spring means acts on said first bearing in the same direction as a direction in which said slider is movable.

7. A structure as claimed in claim 6, further comprising:

a case mounted on said framework for supporting said slider in a movable manner;

an adjusting screw threaded into a wall of said case located at an operating side; and an adjusting block disposed in said case in such a manner as to be movable in a direction intersecting a direction in which said slider is movable, in association with the position of said adjusting screw, said adjusting block slidably contacting said slider;

surfaces of said adjusting block and said slider which contact each other being inclined relative to both of said direction of movement of said slider and a direction in which said adjusting block is movable.

8. A structure as claimed in claim 7, wherein said apparatus comprises a plurality of photoconductive elements, said slider, said first bearing, said second bearing, said spring means, said case, said adjusting screw and said adjusting block being associated with the shaft of each of said photoconductive elements.

9. A structure for supporting a photoconductive element included in an image forming apparatus, comprising:

a shaft mounting said photoconductive element thereon and journalled to a framework included in said apparatus;

a slider movable while holding a single bearing which rotatably supports said shaft;

a case supporting said slider in a movable manner;

an adjusting screw threaded into a wall of said case located at an operating side; and an adjusting block received in said case to be movable in a direction intersecting a direction in which said slider is movable, and slidably contacting said slider;

surfaces of said adjusting block and said slider which contact each other being inclined relative to both of said direction of movement of said slider and a direction in which said adjusting block is movable.

10. A structure as claimed in claim 9, wherein said apparatus comprises a plurality of photoconductive elements, said slider, said case, said adjusting screw and said adjusting block being associated with the shaft of each of said photoconductive elements.

11. A structure as claimed in claim 1, wherein said pressing means presses against said first bearing in a first direction to press said first bearing against said framework, and wherein said pressing means presses upon said second bearing in the same first direction to press said second bearing against said shaft.

* * * * *